United States Patent
Heller, Jr.

(10) Patent No.: US 7,469,321 B2
(45) Date of Patent: *Dec. 23, 2008

(54) SOFTWARE PROCESS MIGRATION BETWEEN COHERENCY REGIONS WITHOUT CACHE PURGES

(75) Inventor: Thomas J. Heller, Jr., Rhinebeck, NY (US)

(73) Assignee: International Business Machines Corporation, Armonk, NY (US)

( * ) Notice: Subject to any disclaimer, the term of this patent is extended or adjusted under 35 U.S.C. 154(b) by 838 days.

This patent is subject to a terminal disclaimer.

(21) Appl. No.: 10/603,252

(22) Filed: Jun. 25, 2003

(65) Prior Publication Data

US 2005/0021913 A1    Jan. 27, 2005

(51) Int. Cl.
    *G06F 9/455*    (2006.01)
(52) U.S. Cl. .................. 711/141; 711/135; 718/108
(58) Field of Classification Search ............ 711/141, 711/135; 718/108
See application file for complete search history.

(56) References Cited

U.S. PATENT DOCUMENTS 5,819,061 A * 10/1998 Glassen et al. ............ 718/1
7,032,078 B2 * 4/2006 Cypher et al. ............ 711/141
7,065,761 B2 * 6/2006 Foster et al. ............ 718/100
2004/0268044 A1 * 12/2004 Heller et al. ............ 711/118

OTHER PUBLICATIONS

Jim Handy, "The Cache Memory Book", 2nd ed., 1998 Morgan Kaufmann. pp. 144-145, 159-165.*

* cited by examiner

*Primary Examiner*—Kevin Ellis
*Assistant Examiner*—Jared I Rutz
(74) *Attorney, Agent, or Firm*—Lynn L. Augspurger

(57) ABSTRACT

A multiprocessor computer system has nodes which use processor state information to determine which coherent caches are required to examine a coherency transaction produced by a single originating processor's storage request. A node has dynamic coherency boundaries such that the hardware uses only a subset of the total processors for a single workload at any specific point in time and can optimize cache coherency as the supervisor software or firmware expands and contracts the number of processors used to run any single workload. Multiple instances of a node can be connected with a second level controller to create a larger multiprocessor system. The node controllers use the mode bits to determine which nodes must receive any given transaction. Logical partitions are mapped to allowable physical processors. Cache coherence regions and caches are chosen for their physical proximity. A distinct cache coherency region can be hypervisor defined for each partition.

30 Claims, 10 Drawing Sheets

| Originating Processor | Mode Bit Setting | Node Controller Action: Transmit Transaction to the following processors and/or second level controllers: |
|---|---|---|
| P0 | "000" | Do not forward transaction |
| P0 | "001" | Processor P1 |
| P0 | "010" | All Processors in originating node. |
| P0 | "1xx" | All Processors in originating node and second level controllers |
| P1 | "000" | Do not forward transaction |
| P1 | "001" | Processor P0 |
| P1 | "010" | All Processors in originating node. |
| P1 | "1xx" | All Processors in originating node and second level controller |
| P2 | "000" | Do not forward transaction |
| P2 | "001" | Processor P3 |
| P2 | "010" | All Processors in originating node. |
| P2 | "1xx" | All Processors in originating node and second level controllers |
| P3 | "000" | Do not forward transaction |
| P3 | "001" | Processor P2 |
| P3 | "010" | All Processors in originating node. |
| P3 | "1xx" | All Processors in originating node and second level controllers |

"1xx" is used to describe a 1 in the first bit position and any combination of bit in the second and third bit positions.

FIGURE 4.

| Originating Node | Mode Bit Setting | Second Level Controller Action: Transmit transaction to the following nodes: |
|---|---|---|
| 0 | "0xx" | Not Applicable |
| 0 | "101" | Node 1 |
| 0 | "111" | All Nodes |
| 1 | "0xx" | Not Applicable |
| 1 | "101" | Node 0 |
| 1 | "111" | All Nodes |
| 2 | "0xx" | Not Applicable |
| 2 | "101" | Node 3 |
| 2 | "111" | All Nodes |
| 3 | "0xx" | Not Applicable |
| 3 | "101" | Node 2 |
| 3 | "111" | All Nodes |

FIGURE 5.

| Partition ID | Coherency Mode | Processors Allowed for Dispatch (Node:Processors) | |
|---|---|---|---|
| 0 | "000" | (0:P2) | |
| 1 | "000" | (1:P1) | |
| 2 | "001" | (2:P0)(2:P1) | |
| 3 | "010" | (3:P0)(3:P1)(3:P2)(3:P3) | |
| 4 | "010" | (0:P0)(0:P1)(0:P2)(0:P3) | |
| 5 | "101" | (2:P0)(2:P1)(2:P2)(2:P3) (3:P0)(3:P1)(3:P2)(3:P3) | |
| 6 | "111" | Any processor on any of the 4 nodes | |

FIGURE 6.

Active Coherency Region Table

| Entry # | Coherency Region ID |
|---|---|
| 0 | 4 |
| 1 | 7 |
| 2 | 23 |
| N | 6 |

FIGURE 7.

SOFTWARE PROCESS MIGRATION BETWEEN COHERENCY REGIONS WITHOUT CACHE PURGES

FIELD OF THE INVENTION

This invention relates to a multiprocessor computer system having a plurality of nodes and dynamic cache coherency regions. This invention relates particularly to such a computer system that can move software processes between coherency regions without requiring a selective purging of cache contents.

RELATED APPLICATIONS

This invention is related to an application entitled: Multiprocessor System with Dynamic Cache Coherency Regions, U.S. Ser. No. 10/603,251, filed Jun. 25, 2003, filed concurrently herewith and referenced herein.

This co-pending application and the present application are owned by one and the same assignee, International Business Machines Corporation of Armonk, N.Y.

The description set forth in this related co-pending application is hereby incorporated into the present application by this reference.

Trademarks: IBM® is a registered trademark of International Business Machines Corporation, Armonk, N.Y., U.S.A. Other names may be registered trademarks or product names of International Business Machines Corporation or other companies.

BACKGROUND OF THE INVENTION

The idle time spent by computer processors while waiting for memory references to complete has become a much larger fraction of the total execution time for a wide variety of important commercial and technical computing workloads. Many prior-art techniques have been used in multiprocessor system designs to minimize the time a processor must wait while the access of main storage locations is completed. These techniques fall broadly into two categories. The first category of techniques attempts to find additional instructions for the processors to execute while waiting for the memory reference which is experiencing a delay. These techniques include such hardware and software mechanisms as out of order execution and multithreading. The second category of techniques focuses on minimizing the latency of the memory reference itself, e.g. SRAM caches, DRAM caches and high speed multiprocessor bus architectures. SRAM and DRAM caches have been extremely successful in reducing memory reference latency and one or both are used by all current multiprocessor designs. Prior-art cache designs include specialized hardware and software which maintain cache coherence for multiprocessor systems. For systems which connect a plurality of processors via a shared bus, a snoop bus protocol is typically employed. Each coherent transaction performed upon the shared bus is examined (or "snooped") against data in the caches of all other devices attached to the bus. If a copy of the affected data is found, the state of the cache line containing the data may be updated in response to the coherent transaction.

Although caches have worked well for multiprocessor systems with a moderate number of processors, prior-art multiprocessor designs do not scale well when extended to large numbers of processors for many important workloads including the transaction and database workload simulated by a TPC-C benchmark.

Logical partitioning, as described in U.S. Pat. No. 4,843,541, when using shared processors also causes poor scaling for prior-art system designs when extended to large numbers of processors. U.S. Pat. No. 4,843,541 shows how a virtual machine hypervisor program can be used to "partition the resources in a central electronic complex of a data processing system into a plurality of logical partitions". Logical partitioning is widely used on large multiprocessor systems to run many workloads that operate on private data simultaneously. In a typical system employing logical partitioning, an operating system instance is initialized within each logical partition. The logical partition can have from 1 to n logical processors. The hypervisor is responsible to dispatch each of the logical processors onto a physical processor. If a physical processor is the host of just a single logical processor over a long period of time it is said to be "dedicated" to that logical processor's partition. If a physical processor is the host of the logical processors from multiple partitions it is said to be a "shared" processor. It is desirable, from an overall hardware utilization point of view, for a large multiprocessor system to allow the flexibility of defining many or most of the physical processors as "shared" and allowing the movement of logical processors among the physical processors of the multiprocessor as the utilization of the physical processors fluctuates with external changes. Prior-art multiprocessor cache designs do not scale well for these partitioned workloads, especially when the physical processors are defined as "shared".

A large factor in the poor performance scaling of large multiprocessors for both the large single database workload and the shared logical partition case is the relationship between increasing numbers of processors and the time delay required to communicate among them. Snoop bus protocols require memory references that miss local caches to be broadcast to all caches which may contain a copy of the requested lines, typically all other caches in the system. The bus bandwidth required to distribute the addresses and responses for large multiprocessor systems is very high. The need to provide the required high bandwidth has driven prior-art designs to use switch chips with many wide ports, expensive chip carriers to provide the needed pins, expensive card technology to provide good electrical characteristics and therefore high speed buses, expensive card connectors to provide wide buses etc. The cost of all these elements has become a significant problem when trying to improve the cost/performance of large multiprocessor systems.

Prior-art designs have attempted to solve these two problems, coherency operation latency and address bandwidth limitations, in many different ways but each has imposed other costs on the system design which the current invention seeks to avoid.

Large shared caches, as exemplified in the IBM S/390 G4 design (IBM Journal of Research and Development Volume 41, Numbers 4&5, 1997) have been used in prior-art designs to address both problems. The interconnection of a few large shared caches does provide good latency for requests which hit in the shared cache. The inclusive shared cache also acts as a filter which eliminates the need to broadcast addresses to all of the processors in the system for some cases. The design does not scale well to large numbers of processors. The use of additional processors drives the design to using large multichip modules with many wiring layers and L2 cache chips with an extremely large number of I/O required to provide a port for each of the processors connected.

Multiprocessor systems which rely on directories to track the access of local memory by remote requesters, as exemplified by the Sequent NUMA-Q design ("STiNG: A CC-NUMA Computer System for the Commercial Marketplace", in Proc. 23rd International Symposium of Computer Architecture, May 1996) work to reduce the address bandwidth required for large numbers of processors. They do so at the expense of large RAM directories and an increase in protocol complexity and hardware support. This type of design also depends upon an assumption that the majority of the main storage lines referenced by a particular software process is located on the same physical node as the node that the processor that is executing the workload is currently dispatched on. There are severe performance penalties for cases where a workload is accessing a large number of remote lines since the number of lines that can be "checked out" by remote nodes is limited by the size of the NUMA directories. One goal of the current invention is to allow the movement of the execution of a workload quickly and easily among many processors without the need to move main storage contents and without significant performance degradation.

Hagersten et al., U.S. Pat. No. 5,852,716 describes the use of multiple address partitions in order to define cache coherent operations which are either "local" and confined to a subset of processors in a large multiprocessor or "global" and therefore broadcast to all processors. A local transaction in Hagersten is defined as one which has physical memory allocated to the same subset of processing nodes as the subset to which the processor which originates the storage request belongs. The description beginning on in 63 of column 7 of U.S. Pat. No. 5,852,716 makes it clear that this prior-art invention does not allow the movement of a process between what is referred to as "local domains" without either moving the physical storage associated with that process or by changing the addressing mode to "global".

We have determined that there is a need for techniques to reduce transmission of address requests between various processors in a multiprocessor computer system without using large amounts of SRAM directory and without requiring the movement of main storage contents. In developing solutions for fulfilling this need we have determined that there is an associated need to reduce the latency of all storage reference transactions in large multiprocessor systems.

SUMMARY OF THE INVENTION

In fulfilling these determined needs, we have hardware coherency controls which enable a system which uses multiple cache coherency regions to operate without the use of cache purges during some operations which move software processes between coherency regions. The current invention works for the case (FIG. 8) where a software process is moved out of one coherency region that is no longer going to be used and into another that has been created to cover the same address space as the first but which will include a new set of processing nodes. The preferred embodiment of our invention works to allow a supervisor program to move a software process from one coherency region encompassing one set of processing nodes to another coherency region encompassing another set of processing nodes without requiring cache purges of caches in any of the processing nodes. If the destination coherency region contains fewer hardware processing nodes than the original coherency region, the size of the coherency region has been effectively been reduced.

The preferred embodiment of the invention is embodied in a multiprocessor computer system having a plurality of nodes and which uses a table of active coherency region information associated with each processing node to determine when to alter the prior-art cache state transitions. A supervisor program initializes the tables associated with each processing node. An entry in the table is made for each coherency region that the supervisor program intends to use on that processing node. Each coherency region is assigned a unique coherency region ID which the supervisor can associate with all the software processes that access storage addresses that are encompassed by the coherency region.

Processing nodes which use the invention, as illustrated particularly with FIGS. 9 and 10, are able to identify incoming storage requests which target lines that are no longer part of the address space of any software process that is currently enabled by the supervisor software to be dispatched on the node. In the preferred embodiment this information allows a processing node to identify cache lines that are no longer actively used by any software processes on that node and to change the cache entries to invalid in response to a storage request from outside the coherency region.

The advantages of the invention, as illustrated particularly with FIGS. 9 and 10, are numerous. One advantage of the invention is that it eliminates the need for cache control hardware that would otherwise be required to perform selective purges of caches when moving software processes between cache coherency regions. A second advantage is that the invention allows all of the caches in a system to continue processing coherency transactions while the coherency boundaries for a software process are effectively changed. A third advantage is that cache lines belonging to a software process that is no longer actively being dispatched on a given node can be identified and invalidated thereby enabling their reuse.

These and other improvements are set forth in the following detailed description. For a better understanding of the invention with advantages and features, refer to the description and to the drawings.

DESCRIPTION OF THE DRAWINGS

FIG. 4 illustrates a table that describes how the node controller uses the mode bits to determine which processors must receive any given transaction that is received by the node controller.

FIG. 5 shows a table that describes how the second level controller uses the mode bits to determine which nodes must receive any given transaction that is received by the second level controller.

FIG. 6 shows one possible mapping of logical partitions to allowable physical processors.

FIG. 7 shows additional detail of a hardware implementation of the Active Coherency Region Table. The table is a supervisor software controlled list of the coherency regions which are currently allowed to use the processing node for software process dispatch.

Our detailed description explains the preferred embodiments of our invention, together with advantages and features, by way of example with reference to the drawings.

DETAILED DESCRIPTION OF THE INVENTION

Figure 1:
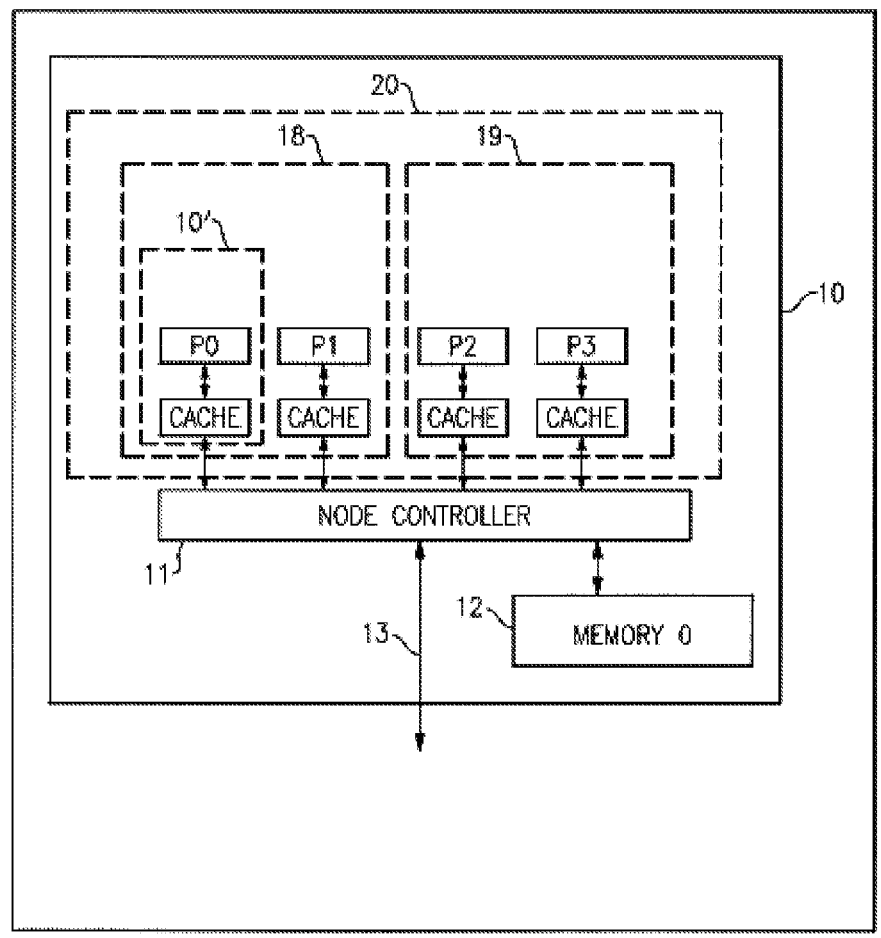
FIG. 1 illustrates a block diagram of a computer with dynamic coherency boundaries. The node controller contains a hardware implementation of the Active Coherency Region Table.
Figure 2:
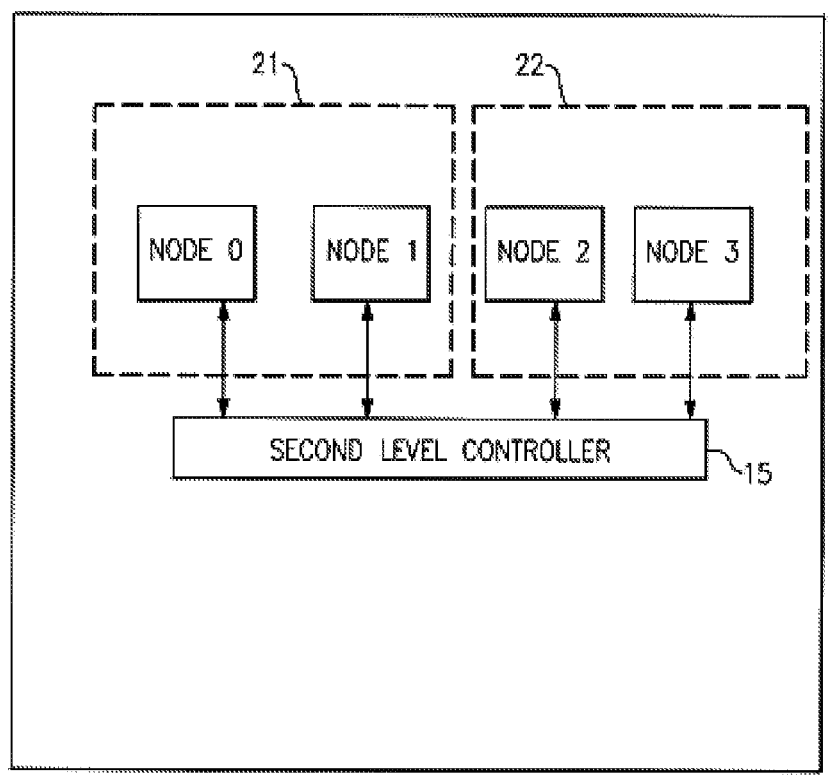
FIG. 2 shows how multiple instances of node of the computer from FIG. 1 can be connected with a second level controller to create a large multiprocessor system.

Turning now to FIG. 1, a block diagram of one embodiment of one node (10) of a computer with dynamic coherency boundaries is shown. FIG. 1 shows a plurality of processors P0-P3, each with a cache, attached to a local node controller (11). The local controller connects multiple processors together with a DRAM main storage element (12). Storage transactions that are initiated by a single processor are transmitted to the node controller which may in turn transmit the transaction to any or all of the other processors in the node. The node controller may also transmit the transaction on bus (13) to other parts of the computing system which contains additional processors (not shown). The Active Coherency Region Table (14) is used by the node controller to determine the proper cache state transitions required in response to storage requests which are entering the node on the bus (13) from other parts of the computing system (not shown). FIG. 2 shows how multiple instances of node (10) from FIG. 1 can be connected with a second level controller (15) to create a large multiprocessor system. FIG. 1 shows the use of 4 processing elements but it should be understood that any number of processing elements could be used. FIG. 1 shows only 1 memory element but it should be understood that any number of memory elements could be used. The preferred embodiment uses the hierarchical bus organization shown in FIGS. 1 and 2, but the invention can be applied to multiprocessor systems that use any other type of interconnect topology.

Figure 3:
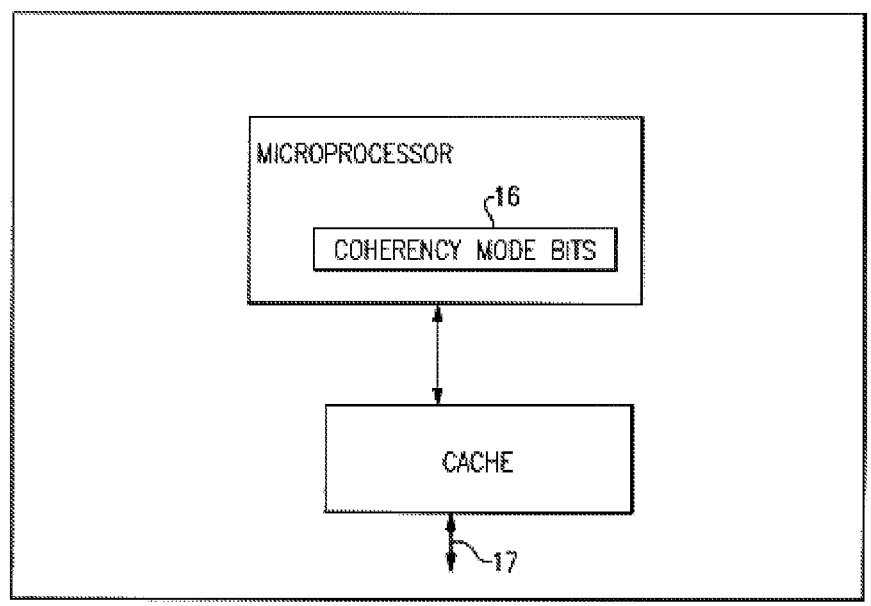
FIG. 3 shows a single processing element from FIG. 1.

FIG. 3 shows a single processing element from FIG. 1. The invention uses one or more coherency mode bits (16) for each processor in the multiprocessor system. The invention uses a coherency region ID for each processor in the multiprocessor system. The coherency mode bits and coherency region ID associated with a processor are sent together with each storage transaction that is initiated by that processor when the transaction is transmitted to the node controller via bus (17) on FIG. 3. It should be understood that a node controller is used in this embodiment but could be replaced with a simple physical bus in other embodiments. The cache coherency hardware in node controller (11) and second level controller (15) use the mode bits associated with each transaction to determine which caches must participate in any storage transactions that they receive from any of the processors. The preferred embodiment uses 3 mode bits. The 3 mode bits are used together to identify the following modes of operation for the node controller and secondary controller. A coherency mode setting of "000" is used to define a coherency region of just a single processor as shown by dashed lines (10') in FIG. 1. Any of the other 3 processors could be used in a single processor coherency region also. A coherency mode setting of "001" is used to define a coherency region of two processors as shown by dashed lines (18) and (19) in FIG. 1. The current embodiment allows the hypervisor to define two-processor coherency regions that cover either (P0 and P1) or (P2 and P3) in order to simplify the hardware controls required in the node controller. Other embodiments could allow other combinations, such as P0 from node 1 and P0 from node 2. A coherency mode setting of "010" is used to define a coherency region that includes all of the processors of a single node as shown by dashed line (20) in FIG. 1. A setting of "101" defines a coherency region that includes two nodes as shown by dashed lines (21) and (22) in FIG. 2. Finally, a processor with a setting of "111" indicates that all storage transactions generated must be sent to all the caches in the entire system.

The coherency mode setting is considered part of the state of a logical partition and therefore part of the state of the logical processors which are defined in that partition. In the current embodiment, all logical processors from a single logical partition have the same coherency mode setting at a single point in time. It should be understood that additional software or firmware could be used to define processes within a single partition which use an isolated set of storage addresses and therefore could be provided a different coherency mode setting and a different set of allowable physical processors to be used for dispatch. When a logical processor is dispatched onto a physical single processor the physical processor temporarily takes on the coherency mode setting of the logical processor. The coherency mode bits are sent with all storage transactions generated by the processor when they are transmitted to the node controller (11). Since many logical partitions can be defined and used at once, many different and overlapping coherency regions are used at the same time. The current invention provides hardware and firmware controls in the node controller (11) and second level controller (15) which use the coherency mode bits that accompany each bus transaction to determine how to route the transaction over the buses which interconnect the processors in the system.

FIG. 4 shows a table that describes how the node controller uses the mode bits to determine which processors must receive any given transaction that is received by the node controller. FIG. 5 shows a table that describes how the second level controller uses the mode bits to determine which nodes must receive any given transaction that is received by the second level controller. FIG. 6 shows one possible mapping of logical partitions to allowable physical processors. In the current embodiment, the node controller will forward all transactions received from the secondary node controller to all the processors connected to the node controller. It should be understood that there are many other potential coherency boundaries that could be established which would require the node controller to transmit requests which come from the second level node controller to just a subset of processors connected to the second level node controller.

The supervisor software creates a unique Coherency Region ID for each process that has its own coherency region. The supervisor software creates a table for each processing node in the system. The table has an entry for every Coherency Region ID that is currently allowed to be dispatched on that processing node.

Alternative approaches may be found in the related patent application. The referenced related patent application U.S. Ser. No. 10/603,251 uses a combination of software control programs and hardware mode bits to define dynamic coherency boundaries in a computing system which utilizes more than one processing node. The coherency boundaries can be adjusted to create coherency regions that cover any number of processing nodes, from one node to all the nodes in the entire system. The related application also describes how multiple coherency regions can be defined, each operating on a private address space. The coherency regions can be expanded to include additional nodes at any time during system operation. The coherency regions can also be reduced in size by removing a processing node from that region, while following the required procedures. Included in those procedures is the need to purge some cache entries in the processing node which is about to be removed from the coherency region. The cache entries which need to be removed are only those that hold cached copies of main storage lines that are part of the coherency region that is being reduced in size. Caches which are unable to perform a selective purge based upon the identification of the coherency region that "owns" the cached line must be purged completely. The selective purges require additional cache controller hardware as compared to prior-art designs. The preferred embodiment illustrated here is applicable to a processing system taking advantage of the ability to eliminate the need for the cache purges when moving a software process between two distinct sets of processing nodes.

The related patent application U.S. Ser. No. 10/603,251 describes how the supervisor software must change the "cache coherence mode" of the processor when dispatching a software process that uses a cache coherency region that is different than previously dispatched software process. The current invention requires that a storage request be tagged with more specific information about the precise coherency region that originated the request. The current invention uses the Coherency Region IDs of the originating process as this more specific tag. In the preferred embodiment the "cache coherency mode" is still used by the node control logic to determine which nodes in a multiprocessor system are required to examine a storage request. The coherency region ID of the current invention is used by the snooping processors to determine the correct snooping response.

It should be understood that an alternative preferred embodiment of the current invention could use the coherency region ID to perform the function of the "cache coherency mode" in addition to the function described for the preferred embodiment. The preferred embodiment makes the assumption that the node controller logic that must read the "cache coherency mode" can be made to be faster and smaller when it can rely on the simple encoding of the "cache coherency mode". The alternative preferred embodiment of this invention provides programmable logic which is found in the node controller which the supervisor program uses to help the node controller determine which physical nodes are associated with specific coherency region IDs.

The current invention alters the logic which is used to decide which processing nodes must examine any particular storage request, as compared to the related patent application. In the referenced related patent application the coherency region, as expressed by the mode bits, was used to make the determination. In the current preferred embodiment of the invention (See FIGS. 9 and 10) this is changed so that any storage request which misses all of the caches in the originator's coherency region is then sent on to all processing nodes in the entire system, regardless of the setting of the mode bits. Requests which hit in the originator's coherency region but which do not have the correct cache state do not need to be sent outside the coherency region. An example of this latter case is a storage request which intends to alter a line of storage but which finds during the course of a storage transaction that a cache within its coherency region has a copy of the line that is marked as shared. The cache state transitions of the current invention are set up to ensure that a cache line cannot be marked as shared in two separate coherency regions. When the supervisor program is moving a coherency region from one set of processing nodes to another set of processing nodes it is effectively leaving behind cache entries for the coherency region on the old nodes. The current invention works to ensure that these old cache entries will be seen by requests originating from the new processing nodes and that cache entries for the same main storage addresses will not be established in the new processing nodes until the old entries are invalidated.

The current invention provides for the use of additional communication between processing nodes as compared to the system described in the related patent application. It is assumed that the current invention will be used in conjunction with large on-node caches that will minimize the number of storage requests which completely miss the on-node caches. The current invention will still enable an overall reduction in the communication between processing nodes as compared to a prior-art design which does not use dynamic coherency boundaries.

The current invention provides for easy movement of software processes between coherency regions. With the use of supervisor software the invention enables a cache controller in a processing node to be sure that no copy of a requested storage address exists outside that processor's current coherency region, as specified by the current coherency region mode, whenever a cache entry for the requested storage address is found to exist on any cache in the processing node that contains the processor that initiated the request.

The new coherency region ID is used by the snooping caches to decide how to respond to a storage request. If the coherency region ID attached to an incoming request does not match any of the IDs in the processing node's active coherency region table then the caches in the processing node respond with the usual MESI protocol response and then set the cache to invalid. If the change to invalid requires dirty data to be written back to main storage then that operation is also started at the same time. FIG. 7 shows an example of an Active Coherency Region ID table that is used by a processing node during incoming storage transaction processing. The table can be made arbitrarily large to accommodate the expected number of entries, one per unique coherency region that is active on this processing node. The preferred embodiment uses a hardware table but it should be clear that any combination of software, firmware or hardware could be used to implement the required function for the invention.

Figure 8:
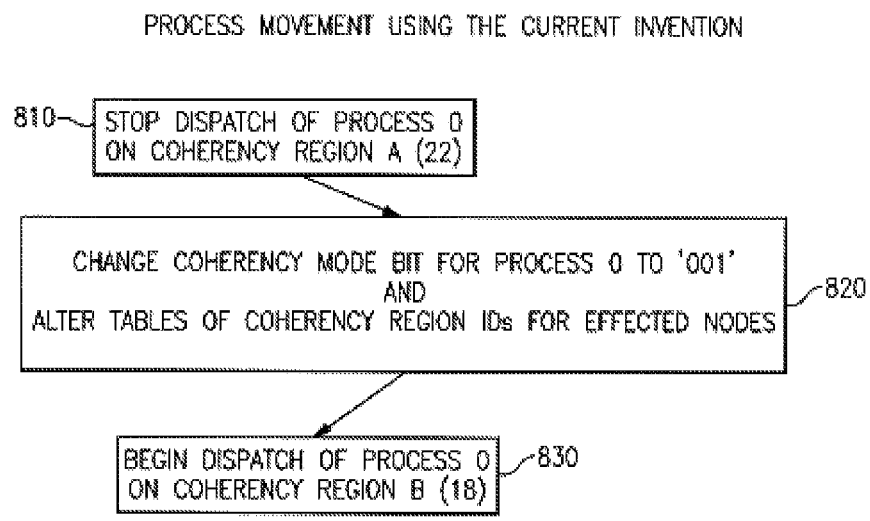
FIG. 8 illustrates particularly how supervisor software moves a software process out of one coherency region that is no longer going to be used by that software process and into another coherency region that has been created to cover the same address space as the first but which will include a new set of processing nodes.

FIG. 8 illustrates how supervisor software moves a software process out of one coherency region that is no longer going to be used by that software process and into another coherency region that has been created to cover the same address space as the first but which includes a new set of processors or nodes. As illustrated in FIG. 8, at step 810 the process stops dispatch of process 0 on coherency region A (22 in FIG. 2). During step 820 the supervisor software changes the Coherency Mode Bits for process 0 and alters the Active Coherency Region Tables (ACRTs) on the node controllers of the system. The Coherency Region ID of process 0 is removed from the ACRTs of Node 2 and Node 3 (FIG. 2). The Coherency Region ID of process 0 is added to the ACRT of Node 0. Thus the changes made in 820 allows the beginning of dispatch at step 830 of the process 0 on a new set of processors on coherency region B (18 in FIG. 1).

Now, in response to the ACRT changes, processing nodes 2 and 3 are able to identify incoming storage requests which target lines that are no longer part of the address space of any software process that is currently enabled by the supervisor software to be dispatched on the node. This allows the caches attached to the nodes to identify cache lines that are no longer actively used by any software processes on that processing node and to change the cache entries for that processing node to invalid in response to a storage request from outside the coherency region. This method also allows all of the caches in said multiprocessor computer system to continue processing coherency transactions while the coherency boundaries for a software process are effectively changed. The method also identifies and invalidates cache lines belonging to a software process that is no longer actively being dispatched on a given processing node thereby enabling their reuse.

Figure 9:
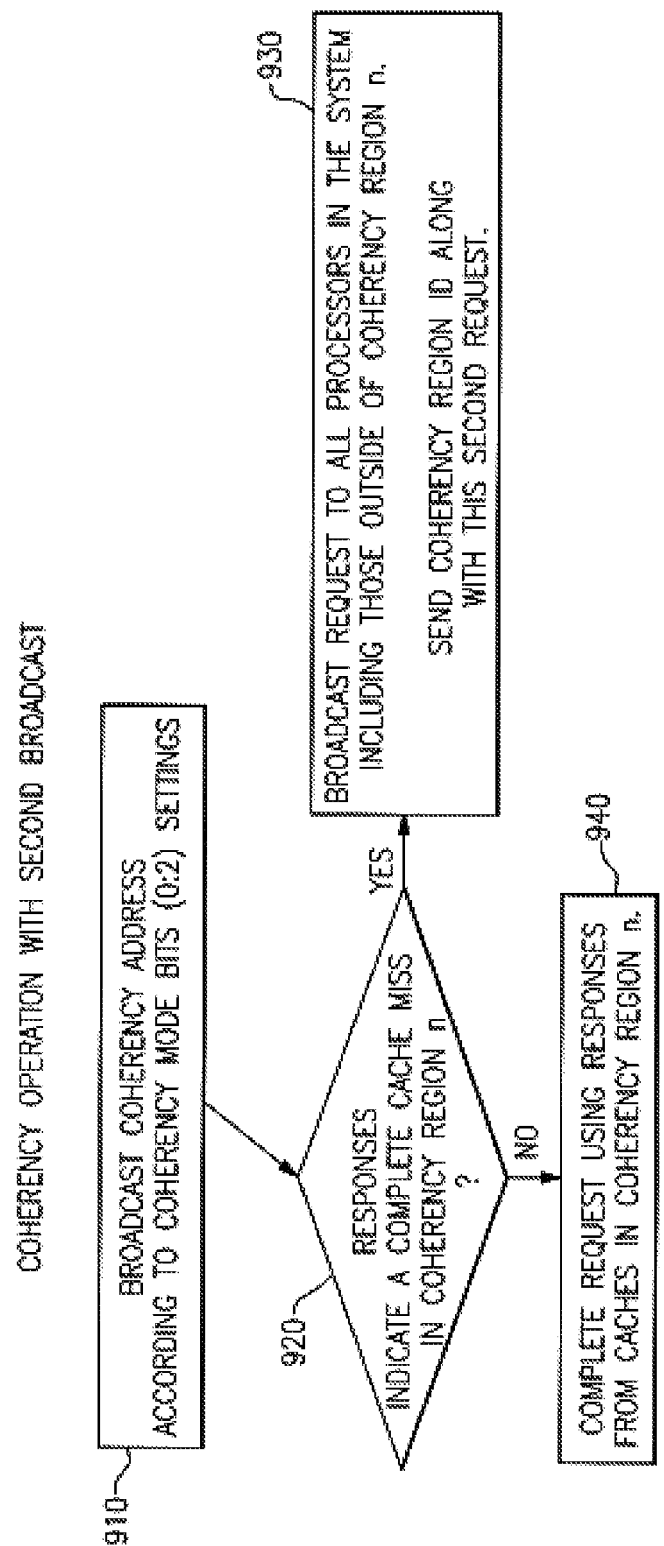
FIG. 9 illustrates particularly incoming storage requests, some of which misses all of the caches in an originator's coherency region and some of which hit in an originator's coherency region.
Figure 10:
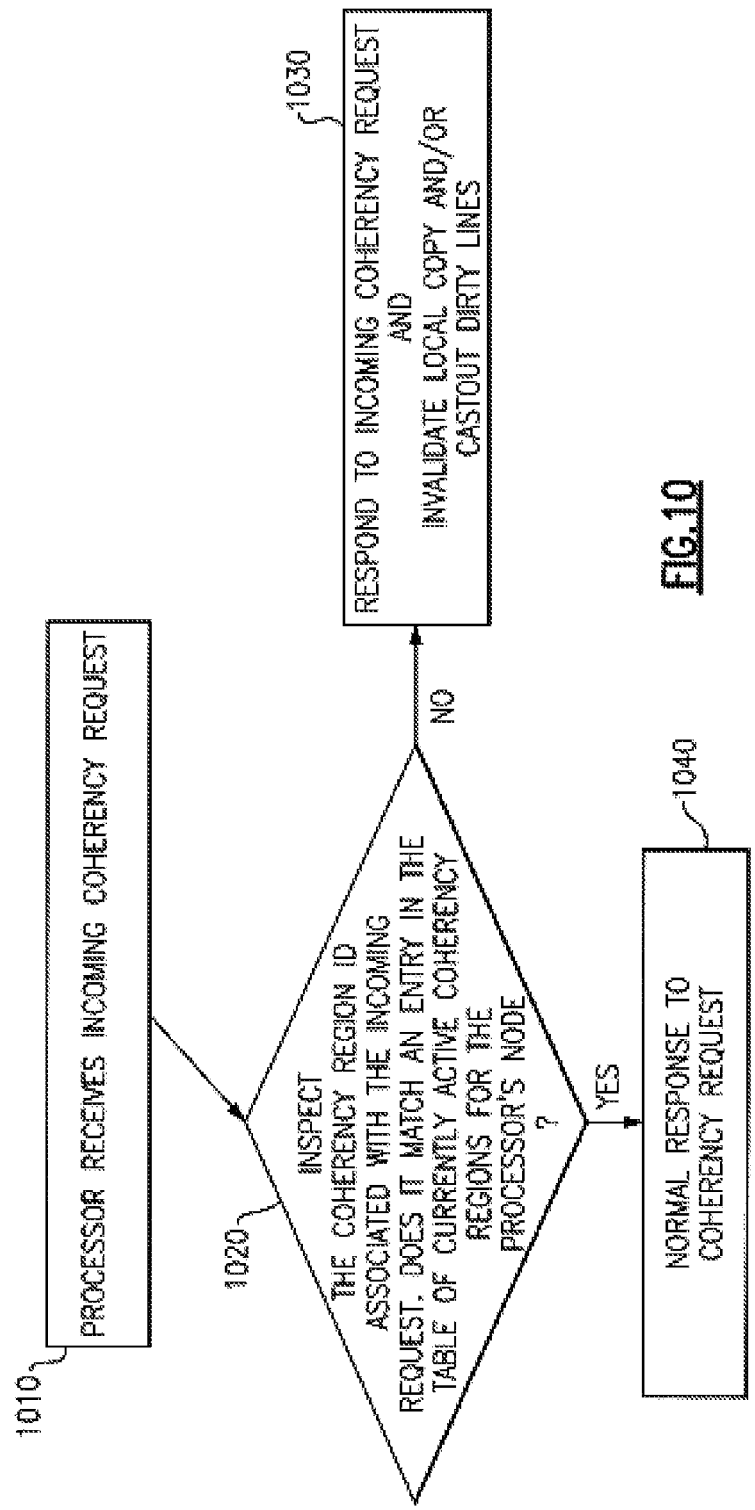
FIG. 10 illustrates particularly processing nodes which are able to identify incoming storage requests which are target lines that are no longer part of the address space of any software process that is currently enabled by the supervisor software to be dispatched on the node.

FIG. 9 shows how this is achieved. Coherency requests are first broadcast only within the coherency region specified by the Coherency Mode Bit setting of the processor which originates the storage request (910). The originating processor collects the initial responses from the other processors in the coherence region and determines whether the request has missed all of the caches in the coherence region (920). Any storage request which misses all of the caches in an originating processor's coherency region is rebroadcast (930) to all processing nodes in the entire system, regardless of the setting of the coherency mode bits. The Coherency Region ID of the process which initiated the request is sent along with the storage request during this second broadcast. If it is determined that the first storage request hit in one of the caches of the initial coherency region the request is completed using just those responses (940) with no need to broadcast the request outside of the coherency region. Thus, as shown in FIG. 10 when a node receives an incoming storage request (1010) that includes a Coherency Region ID, it tests (1020) to determine if the Coherency Region ID matches an entry in the node's Active Coherency Region Table. If it does then the node provides a normal response to the coherency request (1040). If the Coherency Region ID does not match any entry in the node's Active Coherency Region Table then the node has determined that any cache entry associated with the request must be "left over" from a process that has been moved to a new coherency region. In this case (1030), the node responds to the coherency request and then invalidates the local copy and/or performs a castout of dirty lines. The actions described in FIG. 9 will cause any line that was "left over" in the "old" coherency region, the coherency region of the process before the process was moved, to be removed from the "old" coherency region after the first attempted access to the same line by the process in the new coherency region that hosts the process after it has been moved.

What is claimed is:

1. A multiprocessor computer system, comprising:
    a plurality of processing nodes and a plurality of dynamic cache coherency regions using caches associated with said processing nodes, and having a supervisor software and
    cache controller logic in said processing nodes controlling software-initiated movement of software processes between said plurality of cache coherency regions to delay any need for purging by changing coherency mode bits without immediately requiring a selective purging of cache contents in one or more of said processing nodes that are part of a cache coherency region being changed and when moving a software process between two distinct sets of processing nodes a cache line cannot be marked as shared in two separate coherency regions, and when said supervisor software program is moving a coherency region from one distinct set of old processing nodes to another distinct set of new processing nodes it is leaving behind old cache entries for the coherency region on old nodes and ensures that these old cache entries will be seen by incoming storage requests originating from new processing nodes and that cache entries for main storage addresses in the new processing nodes will not be established until the old entries are invalidated.

2. The multiprocessor computer system according to claim 1, including supervisor software which enables said cache controller logic in a processing node associated with a processor making a storage request to be sure upon an incoming storage request of a processor for a storage address that no copy of the requested storage address exists outside that processor's current coherency region, as specified by the setting of mode bits for a current coherency region mode, whenever a cache entry for a requested storage address is found to exist on any cache in any of said plurality of said processing nodes outside that processor's current coherency region.

3. The multiprocessor computer system according to claim 2, wherein said supervisor software creates a unique Coherency Region ID for each process in said multiprocessor computer system that has its own coherency region.

4. The multiprocessor computer system according to claim 3, wherein supervisor software creates a table in said multiprocessor computer system for each processing node in the system which has an entry for every Coherency Region ID of a process that is currently allowed to be dispatched on a processing node on which a process is running.

5. The multiprocessor computer system according to claim 3, wherein any incoming storage request which misses all of the caches in an originator's coherency region is then sent on to all processing nodes in the entire system, regardless of the setting of said mode bits.

6. The multiprocessor computer system according to claim 3, wherein any incoming storage requests which hit in an originator's coherency region but which do not have a correct cache state do not need to be sent outside the coherency region.

7. The multiprocessor computer system according to claim 2, wherein said supervisor software creates a unique Coherency Region ID for each process of a multiprocessor system that has its own coherency region and one or more coherency mode bits for each processor node in the multiprocessor computer system, and said coherency mode bits and coherency region ID associated with a processor are sent together with each storage transaction that is initiated by that processor when the transaction is transmitted for communication to another processor of said multiprocessor computer system.

8. The multiprocessor computer system according to claim 2, wherein said supervisor software creates a unique Coherency Region ID for each process of a multiprocessor system that has its own coherency region and one or more coherency mode bits for each processor node in the multiprocessor system to identify a coherency region to a node controller for a processing node by said Unique Coherency Region ID.

9. The multiprocessor computer system according to claim 2, wherein said supervisor software creates a unique Coherency Region ID for each process of a multiprocessor system that has its own coherency region and one or more coherency mode bits for each processor node in the multiprocessor computer system, and wherein said mode bits associated with each transaction are used to determine which caches must participate in any storage transactions that they receive from any of the processors of said multiprocessor computer system.

10. The multiprocessor computer system according to claim 2, wherein said supervisor software creates a unique Coherency Region ID for each process of a multiprocessor system that has its own coherency region and one or more coherency mode bits for each processor node in the multiprocessor computer system and enables multiple cache coherency regions to operate without the use of cache purges during some operations which move software processes between coherency regions.

11. The multiprocessor computer system according to claim 10, wherein said supervisor software moves a software process out of one first coherency region that is no longer going to be used by said software process and into another coherency region that has been created to cover the same address space as the one first coherency region but which will include a new set of processing nodes.

12. The multiprocessor computer system according to claim 2, wherein said supervisor software creates a unique Coherency Region ID for each process that has its own coherency region and moves a software process from one coherency region encompassing one set of processing nodes to another coherency region encompassing another set of processing nodes without requiring cache purges of caches in any of the processing nodes.

13. The multiprocessor computer system according to claim 12, wherein moving a software process to said another coherency region which contains fewer hardware processing nodes than the original coherency region reduces the effective size of the coherency region for said processing nodes.

14. The multiprocessor computer system according to claim 1, wherein said multiprocessor computer system having a plurality of said processing nodes uses active coherency region information, which active coherency region information is associated with each processing node to determine when to alter the processing nodes' cache state transitions.

15. The multiprocessor computer system according to claim 14, wherein a supervisor software initializes a table having active coherency region information associated with each processing node and an entry in said table is made for each coherency region that the supervisor software intends to use on an associated processing node.

16. The multiprocessor computer system according to claim 1, wherein a supervisor software assigns a unique coherency region ID for each coherency region which the supervisor can associate with all software processes that access storage addresses that are encompassed by the coherency region.

17. The multiprocessor computer system according to claim 1, wherein processing nodes are able to identify incoming storage requests which target lines that are no longer part of the address space of any software process that is currently enabled by the supervisor software to be dispatched on the node.

18. The multiprocessor computer system according to claim 1, wherein processing nodes are able to identify incoming storage requests which target lines that are no longer part of the address space of any software process that is currently enabled by the supervisor software to be dispatched on the node to thereby identify cache lines that are no longer actively used by any software processes on that processing node and to change the cache entries for that processing node to invalid in response to a storage request from outside the coherency region.

19. The multiprocessor computer system according to claim 1, wherein processing nodes are able to identify incoming storage requests which target lines that are no longer part of the address space of any software process that is currently enabled by the supervisor software to be dispatched on the node and allows all of the caches in said multiprocessor computer system to continue processing coherency transactions while the coherency boundaries for a software process are effectively changed.

20. The multiprocessor computer system according to claim 1, wherein processing nodes are able to identify incoming storage requests which target lines that are no longer part of the address space of any software process that is currently enabled by the supervisor software to be dispatched on the node such that cache lines belonging to a software process that is no longer actively being dispatched on a given processing node are identified and invalidated thereby enabling their reuse.

21. The multiprocessor computer system according to claim 1, wherein a supervisor software uses processor state information to determine which caches in the multiprocessor computer system are required to examine a coherency transaction produced by a single originating processor's incoming storage request.

22. The multiprocessor computer system according to claim 21, wherein a processing node of the multiprocessor computer system has dynamic coherency boundaries such that the multiprocessor computer system uses only a subset of the total processors in a system for a single workload at any specific point in time and can optimize the cache coherency as the supervisor software expands and contracts the number of processors which are being used to run any single workload.

23. The multiprocessor computer system according to claim 22, wherein multiple instances of processing nodes can be connected with a second level controller to create a large multiprocessor system.

24. The multiprocessor computer system according to claim 23, wherein said supervisor software creates a unique Coherency Region ID for each process of a multiprocessor system that has its own coherency region and one or more coherency mode bits for each processor node in the multiprocessor computer system and enables multiple cache coherency regions to operate without the use of cache purges during some operations which move software processes between coherency regions and a node controller uses said mode bits to determine which processors must receive any given transaction that is received by the node controller.

25. The multiprocessor computer system according to claim 24, wherein a second level controller uses the mode bits to determine which processing nodes must receive any given transaction that is received by the second level controller.

26. The multiprocessor computer system according to claim 24, wherein said coherency region ID is used to perform the function of a cache coherency mode and a node controller determines which physical processing nodes are associated with specific coherency region Ids.

27. The multiprocessor computer system according to claim 23, wherein said supervisor software uses logical partitions which are mapped to allowable physical processors and a distinct cache coherency region can be defined for each partition using a hypervisor.

28. A method for use in a multiprocessor computer system, comprising the steps of:
  moving software processes between a plurality of cache coherency regions for caches associated with a plurality of processing nodes of said multiprocessor computer system without requiring a selective purging of cache contents in one or more of said processing nodes, after supervisor software creates a unique Coherency Region ID for each process that has its own coherency region, and
  said supervisor software creates a table in the multiprocessor computer system for each processing node which table has an entry for every Coherency Region ID that is currently allowed to be dispatched on said processing node.

29. The method for the multiprocessor computer system according to claim 28, wherein a unique Coherency Region ID for each process and coherency mode bits associated with a processor node initiating a storage request are sent together with each storage transaction that is initiated by that processor node initiating a storage request with a requested storage address when the transaction is transmitted for communication to another processor of said multiprocessor computer system.

30. The method for the multiprocessor computer system according to claim 28, including a step of enabling with supervisor software the computer system's cache controller logic in a processing node to respond to current coherency region mode bit settings, upon receipt at said processing node of an incoming storage request for a storage address, when no copy of the requested storage address exists outside a processing node's current coherency region, as specified by a current coherency region mode bit settings, whenever a cache entry for a requested storage address is found to exist on any cache in any of said multiprocessor computer system's processing nodes that contains a processor that initiated said incoming storage request.

* * * * *